United States Patent [19]
Markandey et al.

[11] Patent Number: 5,623,281
[45] Date of Patent: Apr. 22, 1997

[54] ERROR DIFFUSION FILTER FOR DMD DISPLAY

[75] Inventors: Vishal Markandey, Dallas; Gregory S. Pettitt, Rowlett, both of Tex.

[73] Assignee: Texas Instruments Incorporated, Dallas, Tex.

[21] Appl. No.: 315,744

[22] Filed: Sep. 30, 1994

[51] Int. Cl.$^6$ .................. G09G 3/34; G09G 3/36
[52] U.S. Cl. .................. 345/108; 345/84; 345/88; 345/89; 345/134; 358/445
[58] Field of Search .................. 345/84, 88, 89, 345/108, 134; 358/448

[56] References Cited

U.S. PATENT DOCUMENTS

| | | | |
|---|---|---|---|
| 5,298,172 | 3/1994 | Gale et al. | 345/108 |
| 5,375,002 | 12/1994 | Kim et al. | 358/448 |
| 5,387,924 | 2/1995 | Gale, Jr. et al. | 345/108 |
| 5,452,024 | 9/1995 | Sampsell | 345/108 |

FOREIGN PATENT DOCUMENTS

| | | | |
|---|---|---|---|
| WO92/09064 | 5/1992 | European Pat. Off. | G09G 3/34 |
| 0520481A3 | 12/1992 | European Pat. Off. | G09G 3/34 |
| 0545412A3 | 6/1993 | European Pat. Off. | H04N 5/20 |

*Primary Examiner*—Raymond J. Bayerl
*Assistant Examiner*—Kuniki C. Lockett
*Attorney, Agent, or Firm*—Robert L. Troike; Leo N. Heiting; Richard L. Donaldson

[57] ABSTRACT

An improved error diffusion filter for a DMD display (10) includes both an inverse gamma LUT (Look-up Table) (51) and an Error LUT (Look-up Table) (82), both responsive to the raster scan red, green, or blue video data for when the video data calls for an intensity level different from the achievable level of a DMD device. The Error LUT (82) provides an error value for that difference. The error is distributed to neighboring DMD devices.

11 Claims, 5 Drawing Sheets

ERROR DIFFUSION FILTER FOR DMD DISPLAY

TECHNICAL FIELD OF THE INVENTION

This invention relates to digital imaging and more particularly to an error diffusion filter for a digital micromirror device (DMD) display.

BACKGROUND OF THE INVENTION

A new projection display that utilizes reflections from hundreds of thousands of micromirrors, each mounted above its own semiconductor memory cell is described in IEEE Spectrum, November 1993, vol. 30, no. 11, written by Jack M. Younse of Texas Instruments Incorporated. The digital micromirror device (DMD) comprises a special light modulator that was invented in 1987 by Larry J. Hornbeck, a Texas Instruments Incorporated scientist. The DMD, or digital micromirror device, covers each memory cell of a CMOS static RAM with a movable micromirror. Electrostatic forces based on the data in this cell tilt the mirror either plus or minus 10 degrees, modulating the light incident on the surface. The light reflected from any of the mirrors passes through a projection lens and creates an image on a large screen. Light from the remaining off mirrors is reflected away from the projection lens and trapped. The portion of the time during each video frame that the mirror remains in the on state determines the shades of grey—from black for zero on time to white for 100 percent on time. Color may be added in two ways, by a color wheel or a 3-DMD set up.

Some DMD devices may have the capability to display only a low number of bits representing the on and off times and, therefore, the shades of grey or shades of color, leading to degradation of the video quality. Also, the use of digital degamma in the DMD display systems entails some loss of resolution (blockiness) in the low intensity regions. Finally, even the best of DMDs can have some defects (pixels stuck on, off, or flat). It is desirable to find some method to provide a correction for these display errors and to provide a more pleasing picture without significantly increasing the time for processing by increasing the number of bits for each on or off time.

SUMMARY OF THE INVENTION

In accordance with one preferred embodiment of the present invention the problem of low number of bits, blockiness due to degamma and DMD defects is alleviated by an improved diffusion filter. The improved filter includes both an inverse gamma look-up table and an error look-up table that is responsive to the video data for providing an error value that is distributed to neighboring DMD devices.

DESCRIPTION OF PREFERRED EMBODIMENTS OF THE PRESENT INVENTION

Figure 1:
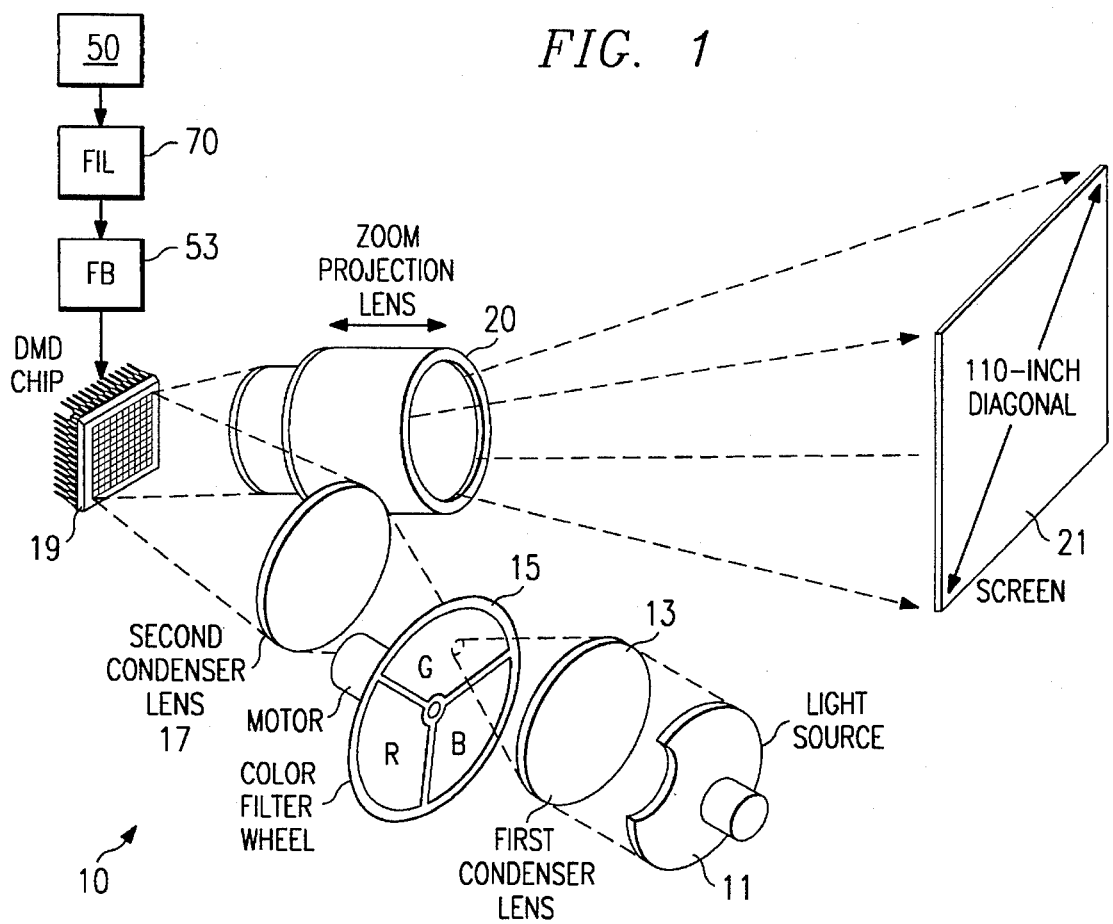
FIG. 1 is an overall block diagram of a Digital Micromirror Display System.
Figure 2:
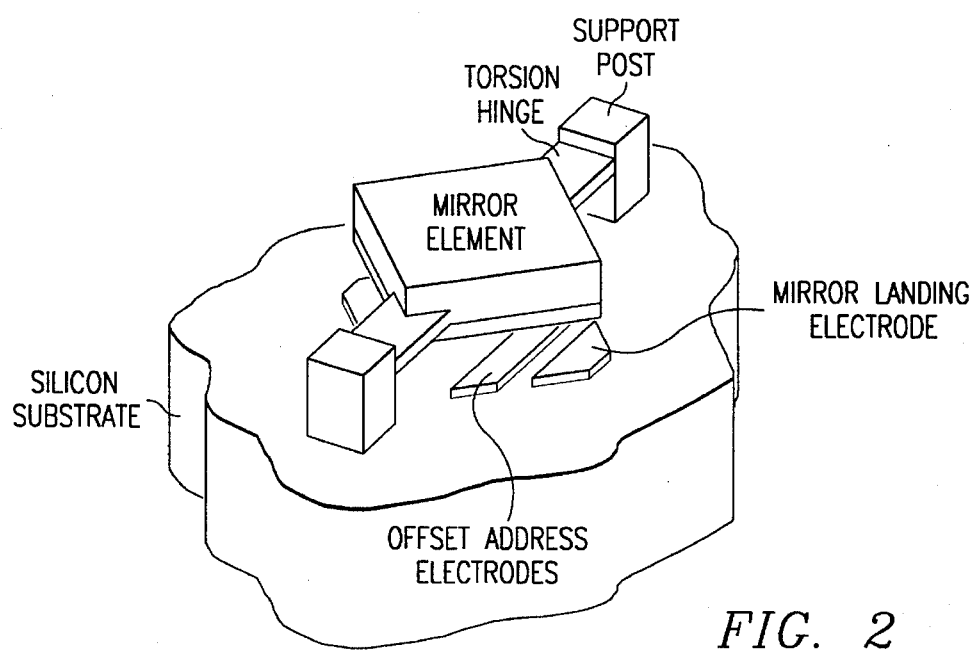
FIG. 2 is a sketch of a micromirror element in FIG. 1.
Figure 3:
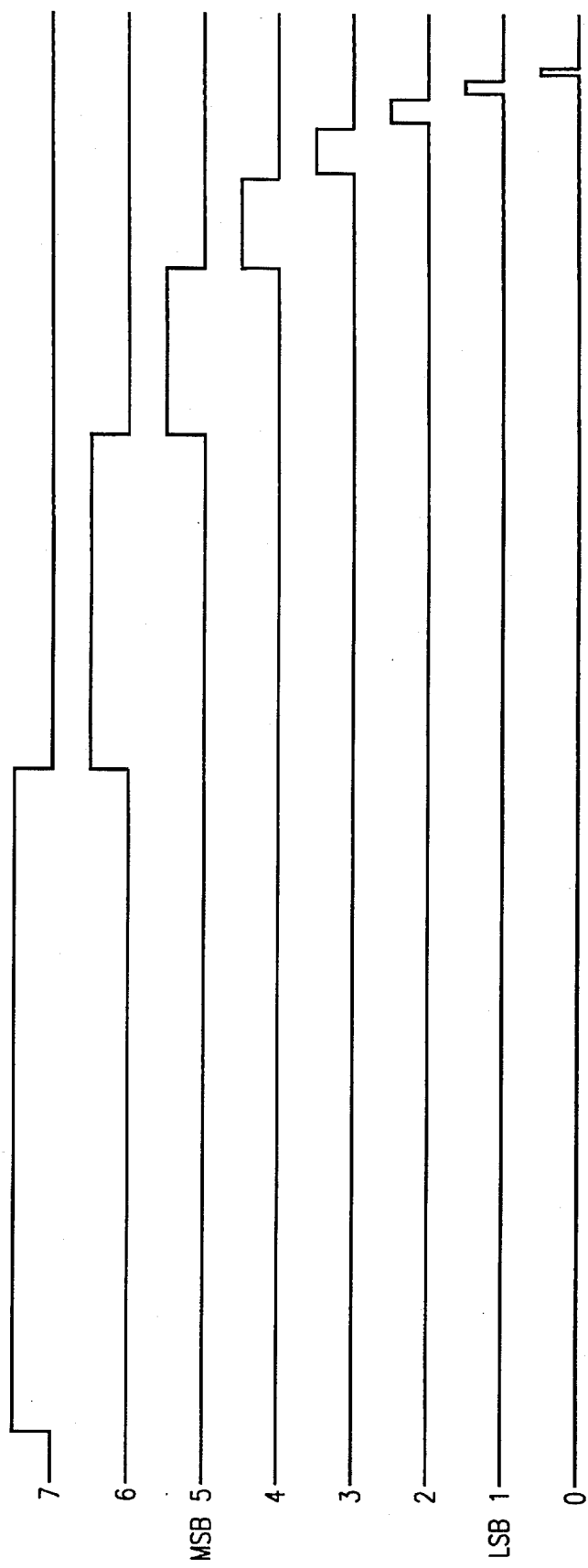
FIG. 3 is a timing diagram illustrating the on-time of MSB and LSB.

Referring to FIG. 1, there is illustrated an overall block diagram of a digital micromirror device (DMD) display system. Referring to FIG. 1, an example of a DMD system 10 is illustrated, wherein the light from a light source 11 is applied through a first condenser lens 13 and through a color wheel 15, which is rotating at about sixty cycles, or hertz, or 60 frames per second. The light passing through the color wheel 15 passes through a second condenser lens 17 onto a DMD chip 19. The DMD chip includes an array of tiny mirror elements, or micromirrors, where each mirror element is hinged by a torsion hinge and support post above a memory cell of a CMOS static RAM as shown in FIG. 2. The movable micromirror tilts into the on or off states by electrostatic forces based on data in the cell. The tilt of the mirror is either plus 10 degrees (on) or minus 10 degrees (off) to modulate the light that is incident on the surface. For additional details, see U.S. Pat. No. 5,061,049 entitled, "Spatial Light Modulator" and U.S. Pat. No. 5,280,277 entitled, "Field Updated Deferrable Mirror Device," both by Larry J. Hornbeck. As shown, the light reflected from any of the mirrors may pass through a projection lens 20 and create images on a large screen 21. As stated previously, the portion of time during which the video frame that a mirror remains in the on state determines the shade of grey. The time duration in which the cell is in the positive direction, or on, is represented by 8 bits of data sent to that cell. The color wheel 15 is divided into red, green, and blue sectors. In the color wheel example, the maximum red would be when the red, for example, would be reflecting the maximum period of time as when the light is on the longest period of time in the red sector. Applicants' invention can also be used in DMD display systems that use three DMD displays in place of a color wheel. The same would go for the other two colors. The minimum would be where the micromirror would not be reflecting through the color wheel and the lens, etc. at all during the color cycle. The intensity resolution in this pulse width modulation (PWM) is limited by the response time of the DMD mirrors. The total time available to display a color frame and the least time required to turn a mirror to the "on" state and back to "off" state defines the resolution of present systems. In the arrangement for the 8 bits, the most significant bit, as illustrated in FIG. 3, is the 7th bit with that bit representing the widest "on" time, the 6th bit being then the next widest "on" time, and the 5th bit representing the third longest "on" time, etc., all the way down to the least significant 0 bit, which is represented by the shortest time period. For example, a sequential color DMD system might have 5 (five) msec (milliseconds) available for a color frame. For 8-bit binary PWM, the least significant bit (0 bit on only), the shortest period would be "on" for about 19.6 microseconds. The mirror on/off time would have to be less than 19.6 msec to implement this scheme with the current method. In a system where the DMD device has the capability of only 6 bits, or even those that have the full eight bits, the system would have too few number of grades of grey or shades of color and, therefore, tend to show blockiness between portions of the picture. This would represent one of the errors that the present invention is to overcome.

Figure 4:
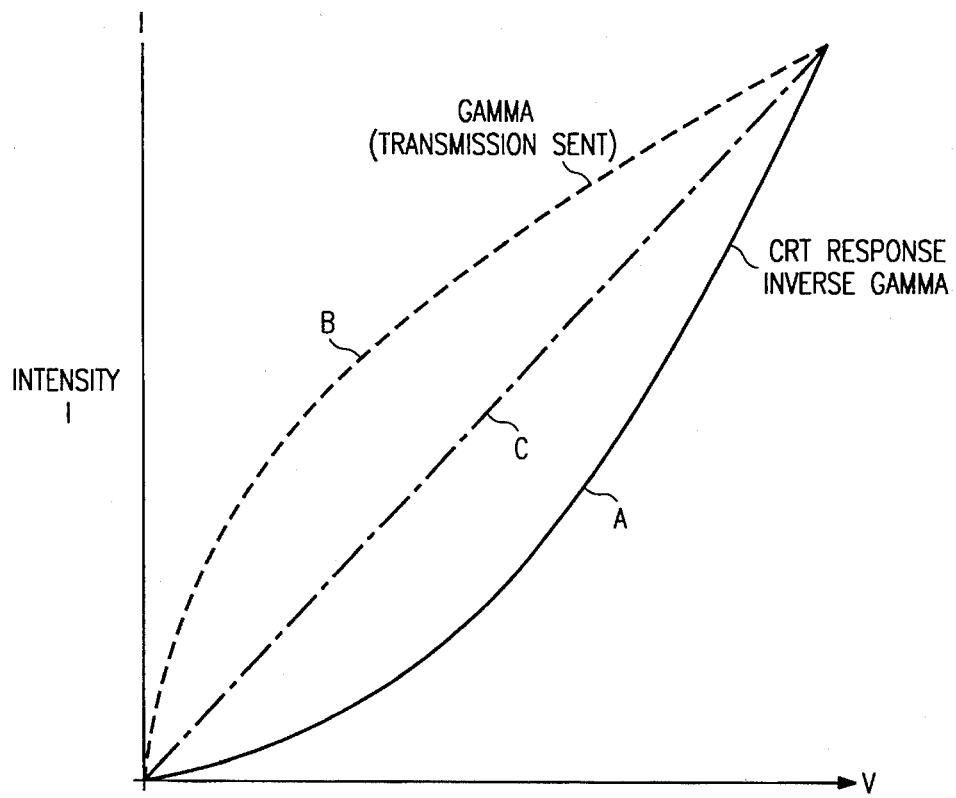
FIG. 4 is a plot of CRT response, gamma transmission sent, and inverse gamma.
Figure 4A:
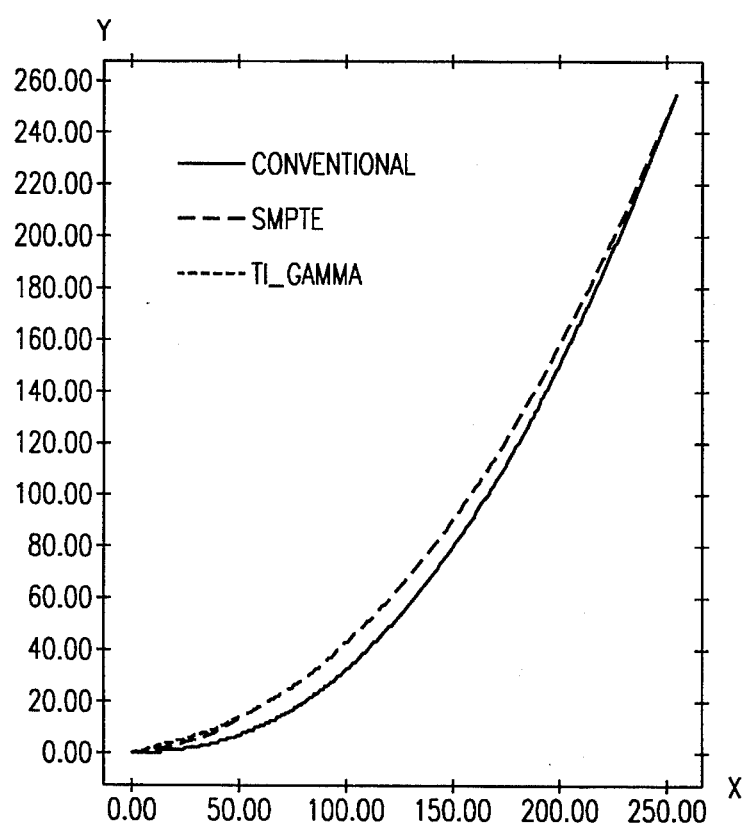
FIG. 4a is a plot in more detail of the inverse degamma of FIG. 4.

Another error is due to the degamma effect in the display. On a typical CRT television display system, the intensity of the picture is a function of the voltage, which is represented by the CRT response in Curve A of the sketch in FIG. 4. Note that the intensity for the lower voltage is nearly flat in the low voltage region, but increases rapidly at middle to highest voltage inputs. In order to correct for this, the transmission that is sent to the display has a gamma characteristic of curve B so that the overall response is linear as represented by the linear solid line C. In order to duplicate the CRT response for the digital micromirror device, a digital degamma characteristic is made to follow curve A of FIG. 4. FIG. 4a is a plot in more detail of Curve A of FIG. 4 for conventional inverse degamma, SMPTE inverse degamma, and Texas Instruments' degamma. A plot of conventional degamma input and output values follows Table 1 in Appendix A. There may be different gamma for red, green and blue, and, therefore, different degamma output tables for red, green and blue.

Figure 5:
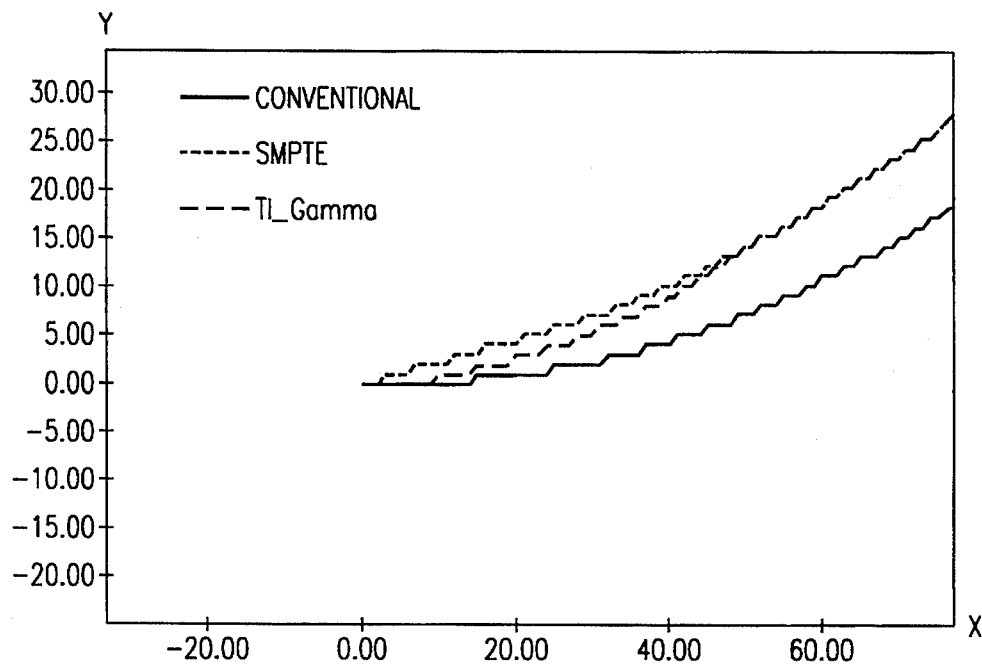
FIG. 5 illustrates the stepped DMD response with LUT.

This degamma correction is done, for example, for each color by providing the raster scanned gamma corrected red, green, or blue video data as shown in FIG. 1 to a separate degamma look-up table (LUT) 50 where for given input threshold levels the mirrors are turned on for given durations. However, due to the micromirror being digital in nature, the output is stepped as shown in FIG. 5 rather than smooth between the thresholds of the bits and, therefore, the grade levels again take on a blockiness particularly in the low intensity regions.

Figure 6:
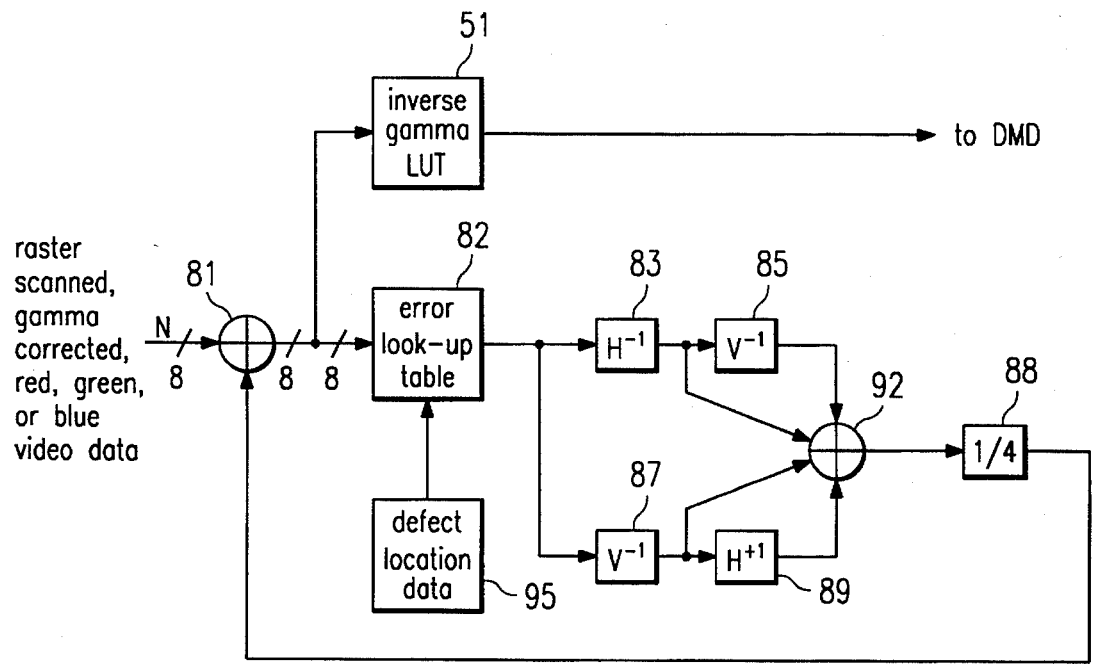
FIG. 6 is a sketch of an error diffusion filter according to one embodiment of the present invention.

In accordance with the present invention, Applicants solve the problems of the low number of bits and blockiness due to degamma, and defective DMDs by an error diffusion filter, as shown in FIG. 6, (FIL in FIG. 1) for each color path (red, green, and blue) on the raster scanned video output that would normally be written into the frame RAM buffer 53. For each input intensity, an output intensity N will be displayed on the DMD device. If the degamma was perfect and there was no lack of bits, the value displayed on the DMD would be some other value N1. We compute the difference between N and N1 and distribute this difference (error) among the neighboring pixels. The error can be distributed among the neighbors in various ways. One implementation is shown in FIG. 6.

Temporal error diffusion can be a post processing step in this algorithm to improve frame to frame visual response and is being investigated.

Figure 7:
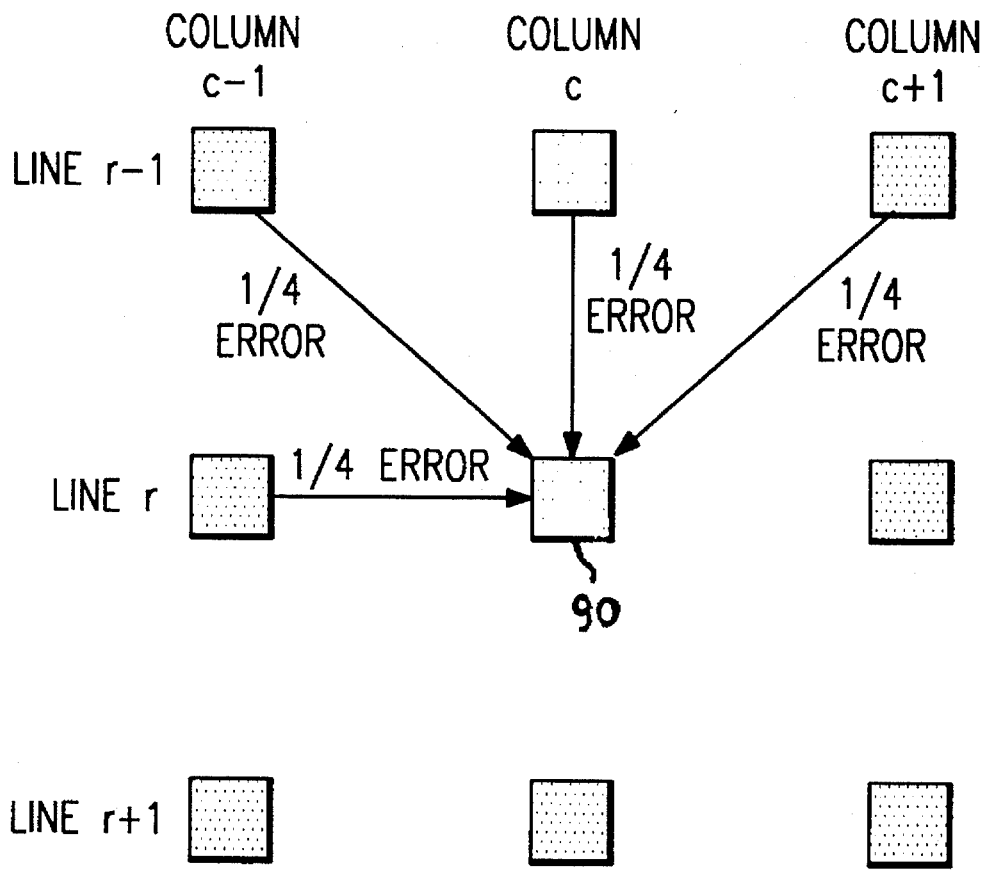
FIG. 7 illustrates the operation of the filter of FIG. 6.

In accordance with one embodiment of the present invention, there is illustrated error diffusion filter according to one embodiment of the present invention. Referring to FIG. 6, the difference between N and N1 is distributed among its neighboring pixels as illustrated in FIG. 7. The implementation is illustrated in FIG. 6 wherein the raster scan gamma corrected red, green, or blue video 8-bit pixel intensity level data is applied, for example, via summer device 81 to both an error look-up table 82 and inverse gamma look-up (LUT) 51. For a gamma corrected video sent that follows Curve B, a perfect inverse gamma is known and follows Curve A. Table 2 in Appendix A for a 8-bit display shows for a given input value (IN) the value N provided by LUT 51 is in column marked "OUT" and is applied to corresponding DMD device. The error or difference value from the ideal N1 is N-N1 and is taken from the error look-up table (LUT) 82 and for an 8-bit display the value is marked as "ERROR" in Table 2. For example, if the input data value is 38, the output value from LUT 51 is 8 and the error value from Error LUT Table 82 is 1. This error is distributed for example as indicated in FIG. 7. The value of pixel 90 has one-quarter of the error from the previous horizontal line r-1 and previous column c-1 via H-1 delay 83 and V-1 delay 85, respectively, divider 88 and summer 92. The value at 90 has one-quarter of the error from the previous picture element in the column C-1 is applied to summer 81 via H-1 delay 83, divider 88 and summer 92. Another one-quarter of the error from the previous line and same column is provided over V-1 delay 87 and divider 88. Another quarter of the error from the previous horizontal line R-1 and the next or C+1 column is applied via V-1 delay 87, H+1 delay 89 and divider 88. The H-1 delay is for one pixel delay, the V-1 delay is one line delay and the H+1 delay would reduce the V-1 delay by one pixel delay. This could be done by a separate FIFO delay by parsing V-1 delay 87. In this manner, the error added at summer 81 enhances the apparent intensity resolution of the video display system at the adjacent pixels.

If the DMD is a 7-bit display, the Tables 51 and 82 provide the values of Table 3 of Appendix A. Table 3 is a partial listing.

A further advantage of the present invention is that the defect compensation can be performed as part of this algorithm. In accordance with the teaching herein, a defective pixel is corrected for by treating this as an error. For this, the DMD coordinates of defective pixels at source 95 is provided to look-up table 82 and the error diffusion needs to be modified to account for the fact that at those locations the pixel displays either bright (stuck ON), dark (stuck OFF), or neutral (flat pixel). The surrounding pixels to the defective pixels are modified in intensity to correct for the failed position of the micromirrors. The look-up table LUT 82 stores error values for these defective locations based on the type of error and the neighboring pixels are modified at summer 81. The error is distributed as discussed previously, such as the distribution as in FIG. 7 by the delays and summer 92 and divider of FIG. 6.

Other Embodiments

Although the present invention and its advantages have been described in detail, it should be understood that various changes, substitutions and alterations can be made herein without departing from the spirit and scope of the invention as defined by the appended claims.

APPENDIX A

TABLE 1

| Inverse Degamma Values (Conventional) | |
|---|---|
| In | Out |
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 1 |
| 16 | 1 |
| 17 | 1 |
| 18 | 1 |
| 19 | 1 |
| 20 | 1 |
| 21 | 1 |

TABLE 1-continued

Inverse Degamma Values (Conventional)

| In | Out |
|---|---|
| 22 | 1 |
| 23 | 1 |
| 24 | 1 |
| 25 | 2 |
| 26 | 2 |
| 27 | 2 |
| 28 | 2 |
| 29 | 2 |
| 30 | 2 |
| 31 | 2 |
| 32 | 3 |
| 33 | 3 |
| 34 | 3 |
| 35 | 3 |
| 36 | 3 |
| 37 | 4 |
| 38 | 4 |
| 39 | 4 |
| 40 | 4 |
| 41 | 5 |
| 42 | 5 |
| 43 | 5 |
| 44 | 5 |
| 45 | 6 |
| 46 | 6 |
| 47 | 6 |
| 48 | 6 |
| 49 | 7 |
| 50 | 7 |
| 51 | 7 |
| 52 | 8 |
| 53 | 8 |
| 54 | 8 |
| 55 | 9 |
| 56 | 9 |
| 57 | 9 |
| 58 | 10 |
| 59 | 10 |
| 60 | 11 |
| 61 | 11 |
| 62 | 11 |
| 63 | 12 |
| 64 | 12 |
| 65 | 13 |
| 66 | 13 |
| 67 | 13 |
| 68 | 14 |
| 69 | 14 |
| 70 | 15 |
| 71 | 15 |
| 72 | 16 |
| 73 | 16 |
| 74 | 17 |
| 75 | 17 |
| 76 | 18 |
| 77 | 18 |
| 78 | 19 |
| 79 | 19 |
| 80 | 20 |
| 81 | 20 |
| 82 | 21 |
| 83 | 22 |
| 84 | 22 |
| 85 | 23 |
| 86 | 23 |
| 87 | 24 |
| 88 | 25 |
| 89 | 25 |
| 90 | 26 |
| 91 | 26 |
| 92 | 27 |
| 93 | 28 |
| 94 | 28 |
| 95 | 29 |
| 96 | 30 |
| 97 | 30 |
| 98 | 31 |
| 99 | 32 |
| 100 | 33 |
| 101 | 33 |
| 102 | 34 |
| 103 | 35 |
| 104 | 35 |
| 105 | 36 |
| 106 | 37 |
| 107 | 38 |
| 108 | 39 |
| 109 | 39 |
| 110 | 40 |
| 111 | 41 |
| 112 | 42 |
| 113 | 43 |
| 114 | 43 |
| 115 | 44 |
| 116 | 45 |
| 117 | 46 |
| 118 | 47 |
| 119 | 48 |
| 120 | 49 |
| 121 | 49 |
| 122 | 50 |
| 123 | 51 |
| 124 | 52 |
| 125 | 53 |
| 126 | 54 |
| 127 | 55 |
| 128 | 56 |
| 129 | 57 |
| 130 | 58 |
| 131 | 59 |
| 132 | 60 |
| 133 | 61 |
| 134 | 62 |
| 135 | 63 |
| 136 | 64 |
| 137 | 65 |
| 138 | 66 |
| 139 | 67 |
| 140 | 68 |
| 141 | 69 |
| 142 | 70 |
| 143 | 71 |
| 144 | 73 |
| 145 | 74 |
| 146 | 75 |
| 147 | 76 |
| 148 | 77 |
| 149 | 78 |
| 150 | 79 |
| 151 | 81 |
| 152 | 82 |
| 153 | 83 |
| 154 | 84 |
| 155 | 85 |
| 156 | 87 |
| 157 | 88 |
| 158 | 89 |
| 159 | 90 |
| 160 | 91 |
| 161 | 93 |
| 162 | 94 |
| 163 | 95 |
| 164 | 97 |
| 165 | 98 |
| 166 | 99 |
| 167 | 100 |
| 168 | 102 |
| 169 | 103 |
| 170 | 105 |
| 171 | 106 |

TABLE 1-continued

Inverse Degamma Values (Conventional)

| In | Out |
|---|---|
| 172 | 107 |
| 173 | 109 |
| 174 | 110 |
| 175 | 111 |
| 176 | 113 |
| 177 | 114 |
| 178 | 116 |
| 179 | 117 |
| 180 | 119 |
| 181 | 120 |
| 182 | 121 |
| 183 | 123 |
| 184 | 124 |
| 185 | 126 |
| 186 | 127 |
| 187 | 129 |
| 188 | 130 |
| 189 | 132 |
| 190 | 133 |
| 191 | 135 |
| 192 | 137 |
| 193 | 138 |
| 194 | 140 |
| 195 | 141 |
| 196 | 143 |
| 197 | 145 |
| 198 | 146 |
| 199 | 148 |
| 200 | 149 |
| 201 | 151 |
| 202 | 153 |
| 203 | 154 |
| 204 | 156 |
| 205 | 158 |
| 206 | 159 |
| 207 | 161 |
| 208 | 163 |
| 209 | 165 |
| 210 | 166 |
| 211 | 168 |
| 212 | 170 |
| 213 | 172 |
| 214 | 173 |
| 215 | 175 |
| 216 | 177 |
| 217 | 179 |
| 218 | 181 |
| 219 | 182 |
| 220 | 184 |
| 221 | 186 |
| 222 | 188 |
| 223 | 190 |
| 224 | 192 |
| 225 | 194 |
| 226 | 196 |
| 227 | 197 |
| 228 | 199 |
| 229 | 201 |
| 230 | 203 |
| 231 | 205 |
| 232 | 207 |
| 233 | 209 |
| 234 | 211 |
| 235 | 213 |
| 236 | 215 |
| 237 | 217 |
| 238 | 219 |
| 239 | 221 |
| 240 | 223 |
| 241 | 225 |
| 242 | 227 |
| 243 | 229 |
| 244 | 231 |
| 245 | 234 |
| 246 | 236 |
| 247 | 238 |
| 248 | 240 |
| 249 | 242 |
| 250 | 244 |
| 251 | 246 |
| 252 | 248 |
| 253 | 251 |
| 254 | 253 |
| 255 | 255 |

*Conventional

APPENDIX A

TABLE 2

Look-up Tables for 8-bit Display

| In | LUT 51 Out | LUT 82 Error |
|---|---|---|
| 0 | 0 | 0 |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 0 | 9 |
| 10 | 1 | 0 |
| 11 | 1 | 1 |
| 12 | 1 | 2 |
| 13 | 1 | 3 |
| 14 | 1 | 4 |
| 15 | 2 | 0 |
| 16 | 2 | 1 |
| 17 | 2 | 2 |
| 18 | 2 | 3 |
| 19 | 2 | 4 |
| 20 | 3 | 0 |
| 21 | 3 | 1 |
| 22 | 3 | 2 |
| 23 | 3 | 3 |
| 24 | 4 | 0 |
| 25 | 4 | 1 |
| 26 | 4 | 2 |
| 27 | 4 | 3 |
| 28 | 5 | 0 |
| 29 | 5 | 1 |
| 30 | 5 | 2 |
| 31 | 6 | 0 |
| 32 | 6 | 1 |
| 33 | 6 | 2 |
| 34 | 7 | 0 |
| 35 | 7 | 1 |
| 36 | 7 | 2 |
| 37 | 8 | 0 |
| 38 | 8 | 1 |
| 39 | 8 | 2 |
| 40 | 9 | 0 |
| 41 | 9 | 1 |
| 42 | 10 | 0 |
| 43 | 10 | 1 |
| 44 | 11 | 0 |
| 45 | 11 | 1 |
| 46 | 12 | 0 |
| 47 | 12 | 1 |
| 48 | 13 | 0 |
| 49 | 13 | 1 |
| 50 | 14 | 0 |
| 51 | 14 | 1 |
| 52 | 15 | 0 |

TABLE 2-continued

Look-up Tables for 8-bit Display

| In | LUT 51 Out | LUT 82 Error |
|---|---|---|
| 53 | 15 | 1 |
| 54 | 15 | 2 |
| 55 | 16 | 0 |
| 56 | 16 | 1 |
| 57 | 17 | 0 |
| 58 | 17 | 1 |
| 59 | 18 | 0 |
| 60 | 18 | 1 |
| 61 | 19 | 0 |
| 62 | 19 | 1 |
| 63 | 20 | 0 |
| 64 | 20 | 1 |
| 65 | 21 | 0 |
| 66 | 21 | 1 |
| 67 | 22 | 0 |
| 68 | 22 | 1 |
| 69 | 23 | 0 |
| 70 | 23 | 1 |
| 71 | 24 | 0 |
| 72 | 24 | 1 |
| 73 | 25 | 0 |
| 74 | 25 | 1 |
| 75 | 26 | 0 |
| 76 | 27 | 0 |
| 77 | 27 | 1 |
| 78 | 28 | 0 |
| 79 | 28 | 1 |
| 80 | 29 | 0 |
| 81 | 30 | 0 |
| 82 | 30 | 1 |
| 83 | 31 | 0 |
| 84 | 31 | 1 |
| 85 | 32 | 0 |
| 86 | 33 | 0 |
| 87 | 33 | 1 |
| 88 | 34 | 0 |
| 89 | 35 | 0 |
| 90 | 35 | 1 |
| 91 | 36 | 0 |
| 92 | 37 | 0 |
| 93 | 37 | 1 |
| 94 | 38 | 0 |
| 95 | 39 | 0 |
| 96 | 40 | 0 |
| 97 | 40 | 1 |
| 98 | 41 | 0 |
| 99 | 42 | 0 |
| 100 | 43 | 0 |
| 101 | 43 | 1 |
| 102 | 44 | 0 |
| 103 | 45 | 0 |
| 104 | 46 | 0 |
| 105 | 46 | 1 |
| 106 | 47 | 0 |
| 107 | 48 | 0 |
| 108 | 49 | 0 |
| 109 | 50 | 0 |
| 110 | 51 | 0 |
| 111 | 51 | 1 |
| 112 | 52 | 0 |
| 113 | 53 | 0 |
| 114 | 54 | 0 |
| 115 | 55 | 0 |
| 116 | 56 | 0 |
| 117 | 57 | 0 |
| 118 | 57 | 1 |
| 119 | 58 | 0 |
| 120 | 59 | 0 |
| 121 | 60 | 0 |
| 122 | 61 | 0 |
| 123 | 62 | 0 |
| 124 | 63 | 0 |
| 125 | 64 | 0 |
| 126 | 65 | 0 |
| 127 | 66 | 0 |
| 128 | 67 | 0 |
| 129 | 68 | 0 |

APPENDIX A

TABLE 3

Look-up Tables for 7-bit Display

| In | Out | Error |
|---|---|---|
| 130 | 68 | 1 |
| 131 | 70 | 0 |
| 132 | 70 | 1 |
| 133 | 72 | 0 |
| 134 | 72 | 1 |
| 135 | 74 | 0 |
| 136 | 74 | 1 |
| 137 | 76 | 0 |
| 138 | 76 | 1 |
| 139 | 78 | 0 |
| 140 | 78 | 1 |
| 141 | 80 | 0 |
| 142 | 80 | 1 |
| 143 | 82 | 0 |
| 144 | 82 | 1 |
| 145 | 84 | 0 |
| 146 | 84 | 1 |
| 147 | 86 | 0 |
| 148 | 88 | 0 |
| 149 | 88 | 1 |
| 150 | 90 | 0 |
| 151 | 90 | 1 |
| 152 | 92 | 0 |
| 153 | 92 | 1 |
| 154 | 94 | 0 |
| 155 | 96 | 0 |
| 156 | 96 | 1 |
| 157 | 98 | 0 |
| 158 | 98 | 1 |
| 159 | 100 | 0 |
| 160 | 102 | 0 |
| 161 | 102 | 1 |
| 162 | 104 | 0 |
| 163 | 104 | 1 |
| 164 | 106 | 0 |
| 165 | 108 | 0 |
| 166 | 108 | 1 |
| 167 | 110 | 0 |
| 168 | 112 | 0 |
| 169 | 112 | 1 |
| 170 | 114 | 0 |
| 171 | 116 | 0 |
| 172 | 116 | 1 |
| 173 | 118 | 0 |
| 174 | 118 | 1 |
| 175 | 120 | 0 |
| 176 | 122 | 0 |
| 177 | 124 | 0 |
| 178 | 124 | 1 |
| 179 | 126 | 0 |
| 180 | 128 | 0 |
| 181 | 128 | 1 |
| 182 | 130 | 0 |
| 183 | 132 | 0 |
| 184 | 132 | 1 |
| 185 | 134 | 0 |
| 186 | 136 | 0 |
| 187 | 138 | 0 |
| 188 | 138 | 1 |
| 189 | 140 | 0 |

TABLE 3-continued

Look-up Tables for 7-bit Display

| In | Out | Error |
|---|---|---|
| 190 | 142 | 0 |
| 191 | 142 | 1 |
| 192 | 144 | 0 |
| 193 | 146 | 0 |
| 194 | 148 | 0 |
| 195 | 148 | 1 |
| 196 | 150 | 0 |
| 197 | 152 | 0 |
| 198 | 154 | 0 |
| 199 | 154 | 1 |
| 200 | 156 | 0 |
| 201 | 158 | 0 |
| 202 | 160 | 0 |
| 203 | 162 | 0 |
| 204 | 162 | 1 |
| 205 | 164 | 0 |
| 206 | 166 | 0 |
| 207 | 168 | 0 |
| 208 | 170 | 0 |
| 209 | 170 | 1 |
| 210 | 172 | 0 |
| 211 | 174 | 0 |
| 212 | 176 | 0 |
| 213 | 178 | 0 |
| 214 | 178 | 1 |
| 215 | 180 | 0 |
| 216 | 182 | 0 |
| 217 | 184 | 0 |
| 218 | 186 | 0 |
| 219 | 188 | 0 |
| 220 | 190 | 0 |
| 221 | 190 | 1 |
| 222 | 192 | 0 |
| 223 | 194 | 0 |
| 224 | 196 | 0 |
| 225 | 198 | 0 |
| 226 | 200 | 0 |
| 227 | 202 | 0 |
| 228 | 204 | 0 |
| 229 | 204 | 1 |
| 230 | 206 | 0 |
| 231 | 208 | 0 |
| 232 | 210 | 0 |
| 233 | 212 | 0 |
| 234 | 214 | 0 |
| 235 | 216 | 0 |
| 236 | 218 | 0 |
| 237 | 220 | 0 |
| 238 | 222 | 0 |
| 239 | 224 | 0 |
| 240 | 226 | 0 |
| 241 | 228 | 0 |
| 242 | 228 | 1 |
| 243 | 230 | 0 |
| 244 | 232 | 0 |
| 245 | 234 | 0 |
| 246 | 236 | 0 |
| 247 | 238 | 0 |
| 248 | 240 | 0 |
| 249 | 242 | 0 |
| 250 | 244 | 0 |
| 251 | 246 | 0 |
| 252 | 248 | 0 |
| 253 | 250 | 0 |
| 254 | 252 | 0 |
| 255 | 254 | 0 |

*TI_Gamma

What is claimed is:

1. An error diffusion filter for a DMD display comprising:

an inverse gamma look-up table responsive to raster scanned, gamma corrected video data for providing a pixel data intensity level to a given DMD device that is at a closest achievable pixel data intensity level to an exact inverse gamma intensity level;

an error look-up table responsive to said video data for providing an error output value corresponding to the difference between said exact inverse gamma intensity level and said closest immediately achievable intensity level for said given device; and means responsive to said error output value for distributively changing the pixel data intensity levels to DMD devices neighboring said given DMD device in proportion to said error output value.

2. The error diffusion filter of claim 1 wherein said error look-up table further includes a table providing error values based on location of defective DMD devices and said means for changing pixel data intensity levels includes means responsive to said error values based on location of said defective DMD devices for changing pixel data intensity level to DMD devices surrounding said defective DMD devices to visually adjust for said defective DMD devices.

3. The error diffusion filter of claim 1 wherein said means responsive to error output value includes means for summing ¼ of the error from a previous horizontal pixel data element, ¼ of the error from a previous vertical pixel data element, ¼ of the error from the previous horizontal pixel data element to said previous vertical pixel data element, and ¼ of the error from next horizontal data element to said previous vertical pixel data element.

4. The error diffusion filter of claim 3 wherein said means for summing includes a line delay.

5. The error diffusion filter of claim 1 wherein there is a separate inverse gamma look-up table and diffusion operation for red, green and blue video data.

6. An error diffusion filter for a DMD display comprising:

an inverse gamma look-up table responsive to raster scanned, gamma corrected video data for providing a pixel data intensity level to a given DMD device that is at a closest achievable pixel data intensity level to an exact inverse gamma intensity level;

an error look-up table responsive to said video data for providing an error output value corresponding to the difference between said exact inverse gamma intensity level and said closest immediately achievable intensity level; and a summer coupled to DMD devices neighboring said given DMD device and responsive to said error output value for summing said error output value with the pixel data intensity levels for said neighboring DMD devices to visually achieve said exact inverse gamma intensity level.

7. The error diffusion filter of claim 6 wherein said error look-up table further includes a table providing error values based on location of defective DMD devices and said summer error value is based on said defective DMD devices and said summer is coupled to DMD devices surrounding said defective DMD devices for summing said error output values based on said defective DMD devices for changing the pixel data levels to the DMD devices surrounding said defective DMD devices to visually adjust for said defective DMD devices.

8. The error diffusion filter of claim 6 wherein said summer includes a delay line.

9. The error diffusion filter of claim 6 wherein said summer includes summing ¼ of the error from a previous horizontal pixel element ¼ of the error from a previous vertical pixel element, ¼ of the error from the previous horizontal pixel element to said previous vertical pixel element, and ¼ of the error from next horizontal data element to said previous vertical pixel element.

10. A method of filtering a DMD display comprising the steps of:

provwiding a pixel intensity level to each DMD device that is closest intensity level to an exact inverse gamma intensity level using an inverse gamma look-up table;

providing error output value corresponding to the difference between said exact intensity level and the closest achievable intensity level using an error look-up table; and changing the pixel data intensity levels to DMD devices surrounding DMD devices having an error output value in proportion to said error output value.

11. A method of correcting for defective DMD devices in a DMD display comprising the steps of:

determining the location of each of said defective DMD devices;

storing error values in a table based on location of said each of said defective DMD devices; and changing pixel intensity levels of DMD devices surrounding each of said defective DMD devices to visually adjust for the defect.

* * * * *